Aug. 1, 1944.     H. B. WESSENGER     2,354,724
BEARING
Filed July 25, 1941
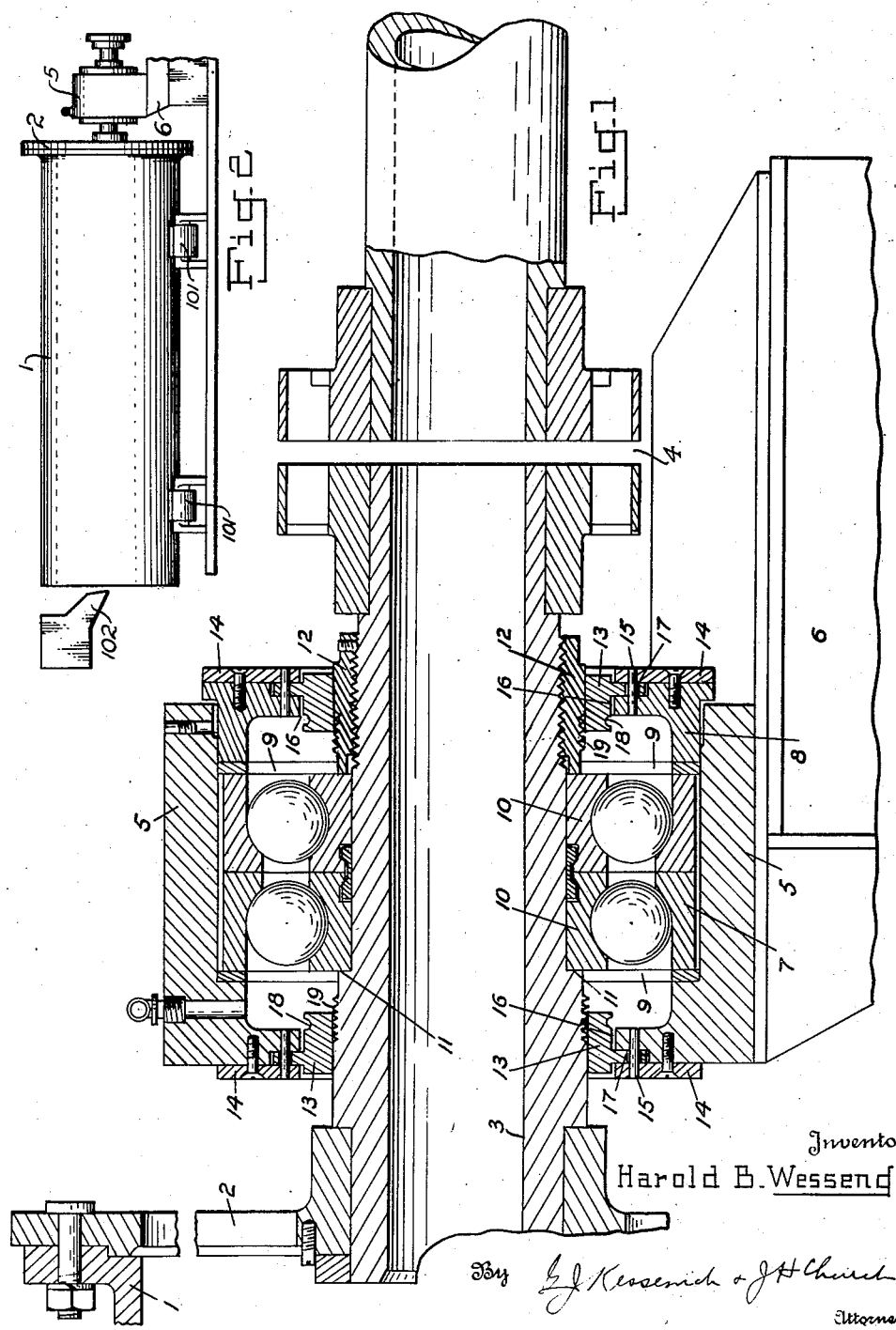
Inventor
Harold B. Wessenger Patented Aug. 1, 1944

2,354,724

UNITED STATES PATENT OFFICE 2,354,724

BEARING

Harold B. Wessenger, Medford, Mass.

Application July 25, 1941, Serial No. 404,027

2 Claims. (Cl. 308—233)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to bearings in general, and in particular to a thrust bearing having novel features, and finds particular adaptation in centrifugal casting machines wherein conditions of service, in part, militate against the use of conventional bearings.

As ordinarily employed, the rotor for centrifugal casting chill molds is longitudinally mounted on a set of stationary rollers and has top rollers resiliently mounted to permit expansion upward when heated. The rotor is driven at the end opposite the pouring end and the drive shaft is equipped with a thrust bearing. The expansion of the rotor results in a vertical displacement of its center line carrying the drive shaft with it. Likewise, distortion of the rotor due to non-uniform expansion will tend to distort the drive shaft within the bearing housing. It is therefore necessary to employ a bearing which will accommodate the shaft in all positions and this is accomplished by providing clearance between the races and the bearing housing and the oil is preserved by provision of an oil retainer ring also spaced from the housing. Oil retention takes on an added importance in casting machines where flying oil may result in serious fires.

It is therefore an object of this invention to provide a bearing which will compensate for transverse excursions of its accommodated shaft.

It is a further object of this invention to provide a bearing which will retain oil under conditions of a transversely shifting shaft.

To these and other ends, the invention consists in the construction, arrangement and combination of elements described hereinafter and pointed out in the claims forming a part of this specification.

A practical embodiment of the invention is illustrated in the accompanying drawing wherein:

Figure 1 shows in axial section an end portion of a casting machine rotor with the horizontal drive shaft, thrust bearing and coupler.

Figure 2 is a view in elevation of the casting rotor and its mounting means.

Referring to the drawing by characters of reference, there is shown a rotor 1 supported by rollers 101, a driving spider 2 and a drive shaft 3. The shaft is loosely coupled to the motor as at 4.

The bearing housing 5 is fixed to a support 6. The outer race 7 of the bearing is snugly retained against displacement longitudinally of the shaft 3 by a keeper ring 8 fixed to the housing 5, but is transversely slidable on the faces of the bronze washers 9. Inner race 10 is snugly fitted on the drive shaft 3 against a thrust shoulder 11 and retained by a ring 12 rotating with the shaft 3.

Closely fitted to the shaft 3 is an oil deflector ring 13 retained in place by a ring plate 14 screwed to the housing 5 and held thereto against rotation by pins 15. A similar deflector on the other face of the bearing is mounted on the race retainer 8. Deflector 13 is spaced from the housing as at 16 and from the pins 15 as at 17 to permit transverse movements of the shaft while maintaining an oil seal at the shaft.

Deflector 13 has a groove 18 which tends to throw the flying oil back into the bearing. Likewise, a helical groove 19 is provided on the shaft and on ring 12 under the deflectors to urge the oil inward.

While a bronze deflector represents the preferred form, it will be understood that this element may be of other materials and may take other forms while retaining the functions of a yielding oil keeper. A felt washer has been employed to this end.

In addition to the supporting rollers 101 shown in Fig. 2, other rollers (not shown) may if desired be provided at the top of rotor 1. These rotors would of course be yieldably mounted to permit expansion upward of the rotor and shaft 3. A pouring spout 102 is indicated as attached to any suitable reservoir to facilitate running the molten metal into the rotor.

It will thus be seen by those skilled in the art that I have provided a thrust bearing which is movable in its housing in a plane perpendicular to the direction of the thrust. Movement in this plane may be resolved into movement along two perpendicular axes. In Fig. 1, one of these axes is in the plane of the figure and perpendicular to the shaft, and the other axis is perpendicular to the plane of the figure. Movement of translation along only one of these axes would give the bearing one "degree of freedom" relative to the housing. Inasmuch, therefore, as translatory movement is permitted along both of the stated axes the bearing has two degrees of freedom relative to its housing.

I claim:

1. In combination, a rotor, bearing means supporting said rotor horizontally, a drive shaft attached to said rotor, a bearing housing surrounding said shaft, and a thrust bearing in said housing and surrounding said shaft and comprising inner and outer races with anti-friction bearings therebetween, said outer race being spaced from said housing throughout its periphery, whereby to allow clearance for the outer bearing race during transverse deformations of the said shaft.

2. In combination, a shaft, bearing means supporting said shaft horizontally, thrust bearing means thereon comprising a housing, an inner race and an outer race in said housing, anti-friction members between said races, and means on the shaft adjacent the said races to limit the motion thereof longitudinally of the shaft, the outer periphery of said outer race being spaced from said housing to afford clearance therewith radially of the shaft whereby flexing of the shaft is facilitated.

HAROLD B. WESSENGER.

CERTIFICATE OF CORRECTION.

Patent No. 2,354,724. August 1, 1944.

HAROLD B. WESSENGER.

It is hereby certified that error appears in the printed specification of the above numbered patent requiring correction as follows: Page 1, first column, line 11, for the word "longitudinally" read --horizontally--; and that the said Letters Patent should be read with this correction therein that the same may conform to the record of the case in the Patent Office.

Signed and sealed this 5th day of September, A. D. 1944.

Leslie Frazer

Seal) Acting Commissioner of Patents.